United States Patent [19]

Terada et al.

[11] Patent Number: 4,838,511
[45] Date of Patent: Jun. 13, 1989

[54] POWER SEAT APPARATUS FOR AUTOMOTIVE VEHICLES

[75] Inventors: Takami Terada, Toyota; Hiroshi Nawa, Chiryu, both of Japan

[73] Assignee: Aisin Seiki Kabushiki Kaisha, Kariya, Japan

[21] Appl. No.: 74,356

[22] Filed: Jul. 16, 1987

[30] Foreign Application Priority Data

Jul. 30, 1986 [JP] Japan .................................. 61-179168

[51] Int. Cl.$^4$ .......................... A47C 1/023; F16D 1/00
[52] U.S. Cl. ........................................ 248/429; 464/92
[58] Field of Search ............... 297/330, 346; 403/354, 403/305, 300, 302, 291; 464/88, 92, 87, 153, 104, 102; 248/424, 429, 430

[56] References Cited

U.S. PATENT DOCUMENTS

| | | | |
|---|---|---|---|
| 1,508,085 | 9/1924 | Cooper | 464/104 |
| 2,297,619 | 9/1942 | HaBerstump | 464/88 |
| 2,348,071 | 5/1944 | Johnstone | 464/153 |
| 2,667,768 | 2/1954 | Winkler | 464/88 |
| 2,857,749 | 10/1958 | Fabbri | 464/88 |
| 2,872,225 | 2/1959 | Walker, Jr. | 464/88 |
| 2,892,328 | 6/1959 | Templeton | 464/104 |
| 2,908,150 | 10/1959 | Stern | 464/88 |
| 2,927,627 | 3/1960 | Lohr . | |
| 2,966,069 | 12/1960 | Wise . | |
| 2,973,214 | 2/1961 | Bates | 464/87 |
| 3,066,907 | 12/1962 | Latimer et al. . | |
| 3,184,209 | 5/1965 | Colautti | 248/429 |
| 3,423,957 | 1/1969 | Palmer | 464/88 |
| 4,645,159 | 2/1987 | Terada | 248/429 |

FOREIGN PATENT DOCUMENTS

| | | | |
|---|---|---|---|
| 320594 | 10/1929 | United Kingdom | 464/88 |
| 720404 | 12/1954 | United Kingdom | 464/87 |

*Primary Examiner*—J. Franklin Foss
*Assistant Examiner*—Robert A. Olson
*Attorney, Agent, or Firm*—Finnegan, Henderson, Farabow, Garrett & Dunner

[57] ABSTRACT

A power seat apparatus for an automotive vehicle in which a screw shaft supported on an upper rail having a seat cushion fastened thereto is moved relative to a lower rail secured to the vehicle body by a speed reducer and motor fixedly mounted on the lower rail. A coupling is provided for coupling an input shaft of the speed reducer and an output shaft of the motor. The input shaft has a longitudinally extending first groove at a distal end thereof, and the coupling has a first wall portion at one end for being inserted into the first groove. The output shaft has a longitudinally extending second groove perpendicular to the first groove at a distal end thereof, and the coupling has a second wall portion at its other end for being inserted into the second groove. The coupling also has an inner wall surface at the one end for receiving an outer wall surface of the distal end of the input shaft, an an inner wall surface at the other end for receiving an outer wall surface of the distal end of the output shaft.

2 Claims, 6 Drawing Sheets

POWER SEAT APPARATUS FOR AUTOMOTIVE VEHICLES

BACKGROUND OF THE INVENTION

1. Field of the Invention

This invention relates to a quietly operating and easily manufactured power seat apparatus for automotive vehicles.

2. Description of the Prior Art

As shown in FIGS. 1 through 3, a power seat 1 for automotive vehicles includes an upper rail 3 to which a seat cushion 2 is fastened, and a lower rail 4 secured to the vehicle body and along which the upper rail 3 is moved back and forth. In order to so move the upper rail 3, a speed reducer 5 and a motor 6 are fixedly secured to the lower rail 4 and the speed reducer 5 is coupld to a screw shaft 7 attached to the upper rail 3. As shown in FIG. 3, the speed reducer 5 includes a worm wheel 8 having a threaded bore threadedly engaged with the screw shaft 7, a worm 9 engaging with the worm wheel 8, and a housing 13 accommodating the worm wheel 8 and worm 9. The speed reducer 5 also has an input shaft 10 connected to an output shaft 11 of motor 6 via a coupling 12.

The rotational torque produced by the motor 6 is transmitted to the input shaft 10 via the coupling 12 and has its direction changed by the worm 9 and worm wheel 8. The rotation of the worm wheel 8 inside the housing 13 causes the screw shaft 7 to move back and forth with respect to the lower rail 4 owing to the threaded engagement between the screw shaft 7 and the threaded bore of the worm wheel 8. This makes it possible to move the seat back and forth.

As shown in FIG. 3 and as set forth in the specification of U.S. Pat. No. 2,927,627, the coupling 12 in the prior-art arrangement of FIG. 3 is bonded to the input and output shafts 10, 11 by vulcanizing a resilient material such as rubber. If the bonding by vulcanization is not carried out after the input and output shafts 10, 11 are centered on each other with a high precision, the shafts 10, 11 may become off-centered. This can cause internal stresses that will quickly lead to deterioration of the apparatus. Furthermore, since the coupling 12 is bonded by vulcanization, the manufacturing costs are high.

SUMMARY OF THE INVENTION

Accordingly, an object of the present invention is to provide a power seat apparatus that solves the aforementioned problems encountered in the prior art.

Another object of the present invention is to provide a power seat apparatus that operates quietly.

According to the present invention, the foregoing objects are attained by providing a power seat apparatus for an automotive vehicle, comprising an upper rail to which a seat cushion is fastened, a screw shaft supported on the upper rail, a lower rail secured to a vehicle body, a motor and speed reducer fixedly mounted on the lower rail for moving the screw shaft relative to the lower rail, thereby moving the upper rail, the motor having an output shaft and the speed reducer having an input shaft, the input shaft having a longitudinally extending first groove at an end thereof and the output shaft having a longitudinally extending second groove perpendicular to the first groove at an end thereof. A coupling for connecting the input shaft and the output shaft together has a first end portion coupled to the input shaft and a second end portion coupled to the output shaft. The coupling includes a first axially extending bore terminating at the first end portion of the coupling and a second axially extending bore terminating at the second end portion and spaced from the first bore for providing a solid divider between the first and second bores. The coupling further includes a first wall portion for being inserted into the first groove, the first wall portion extending the length of the first bore for dividing the first bore into two semi-cylindrical sections, the coupling and the first wall portion being formed as a unitary body, and a second wall portion being perpendicular to the first wall portion and extending the length of the second bore for dividing the second bore into two semi-cylindrical sections, the coupling and the second wall portion being formed as a unitary body. The coupling has a first inner wall surface formed by the first bore for receiving an outer wall surface of the end of the input shaft and a second inner wall surface formed by the second bore for receiving an outer wall surface of the end of the output shaft. The diameter of the first and second inner wall surfaces, the diameter of the outer wall surfaces, the thickness of the first and second wall portions and the thickness of the first and second grooves are relatively dimensioned for fitting the outer wall surfaces of the input and output shafts into the inner wall surface of the coupling, respectively, and the first and second wall portions into the first and second grooves, respectively.

Since the first and second grooves are perpendicular as well as the first and second wall portions, rotation can be transmitted smoothly from the output shaft to the input shaft even if the input and output shafts become somewhat off-center. The arrangement of the invention also facilitates adjustment for centering the input and output shafts. Furthermore, since the coupling makes it possible to absorb misalignment of the input and output shafts, the shafts will not strike the coupling and abnormal noises will not be produced. This means that the power seat will operate quietly. Moreover, assembly is facilitated since the input and output shafts mate with the coupling in insertable relation.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENTS

Figure 1:
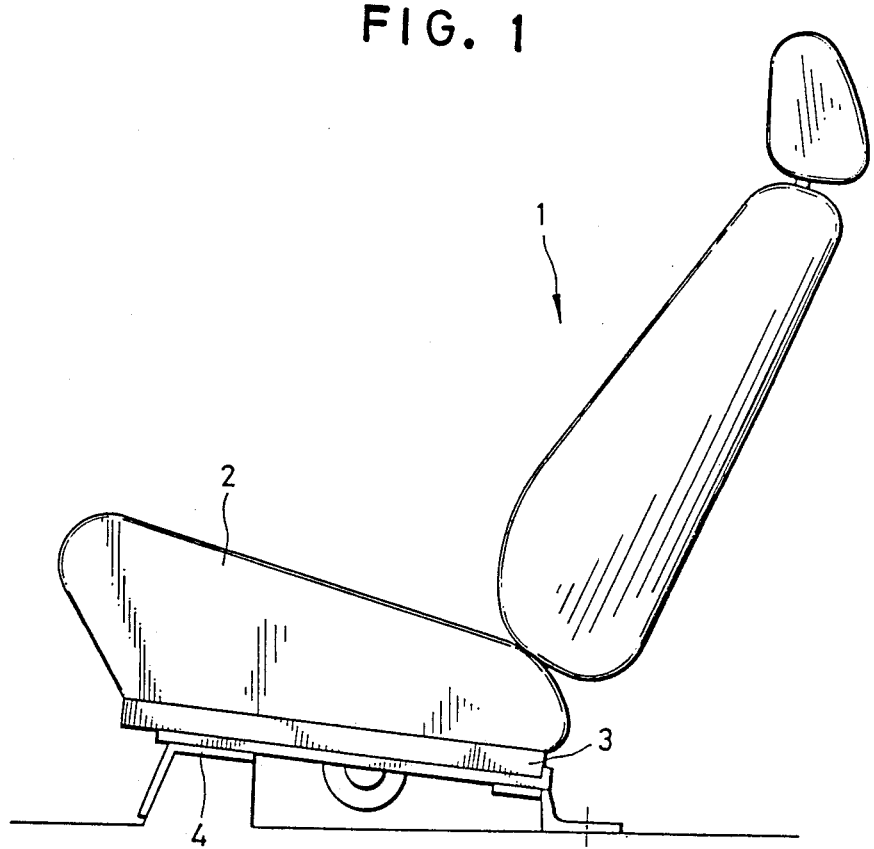
FIG. 1 is a side view illustrating a seat for an automotive vehicle to which the present invention or a prior art is applied.
Figure 2:
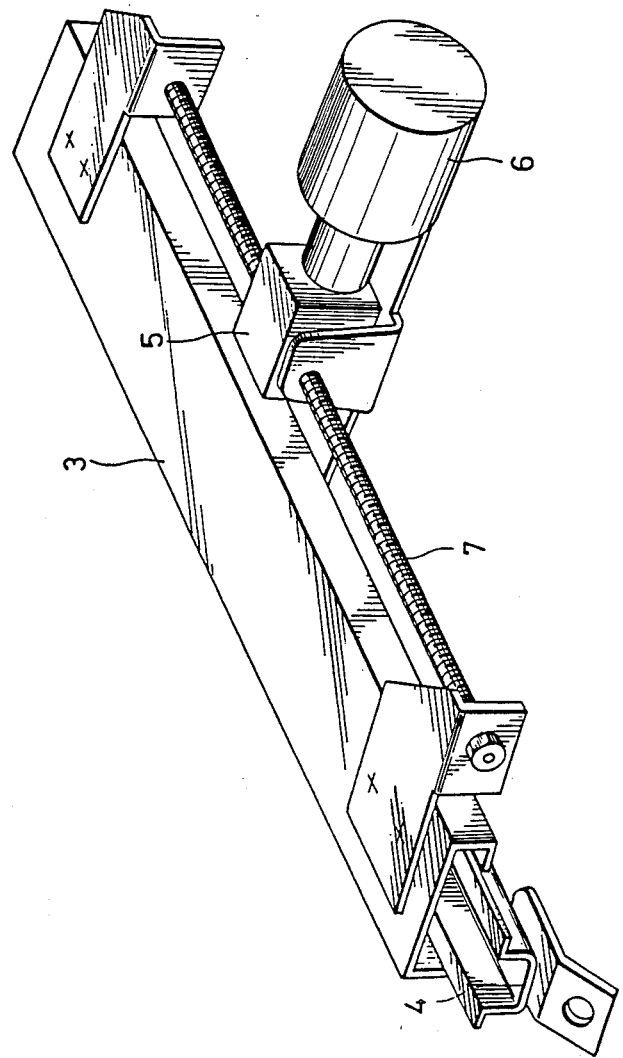
FIG. 2 is a perspective view illustrating the typical fixed and slidable rails of a power seat.
Figure 3:
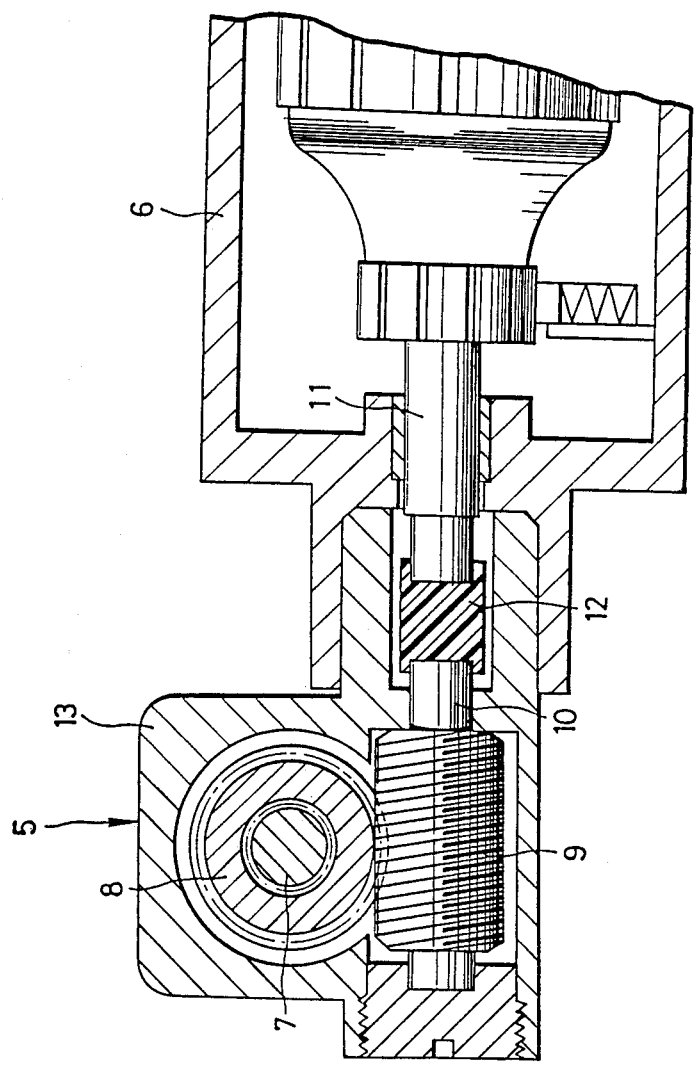
FIG. 3 is a sectional view illustrating a power seat apparatus according to an example of the prior art.
Figure 4:
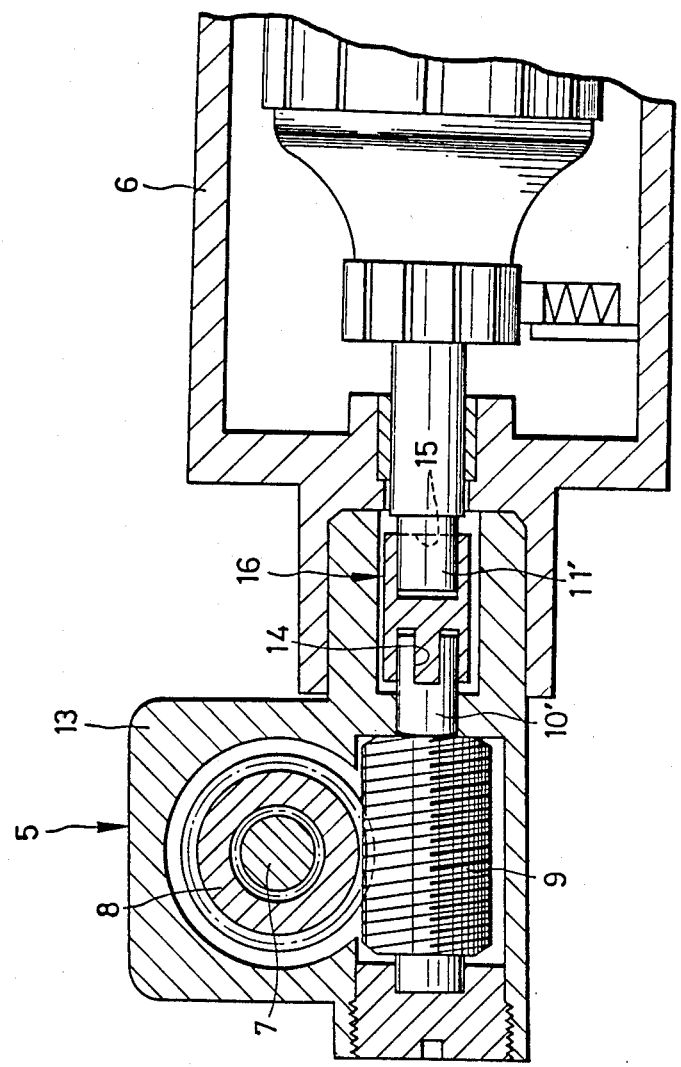
FIG. 4 is a sectional view illustrating an embodiment of a power seat apparatus according to the present invention.
Figure 5:
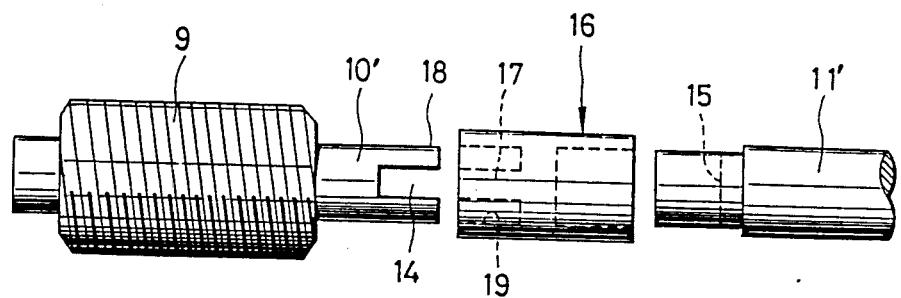
FIG. 5 is a side view illustrating a coupling, an input shaft and an output shaft in the apparatus of FIG. 4.
Figure 6:
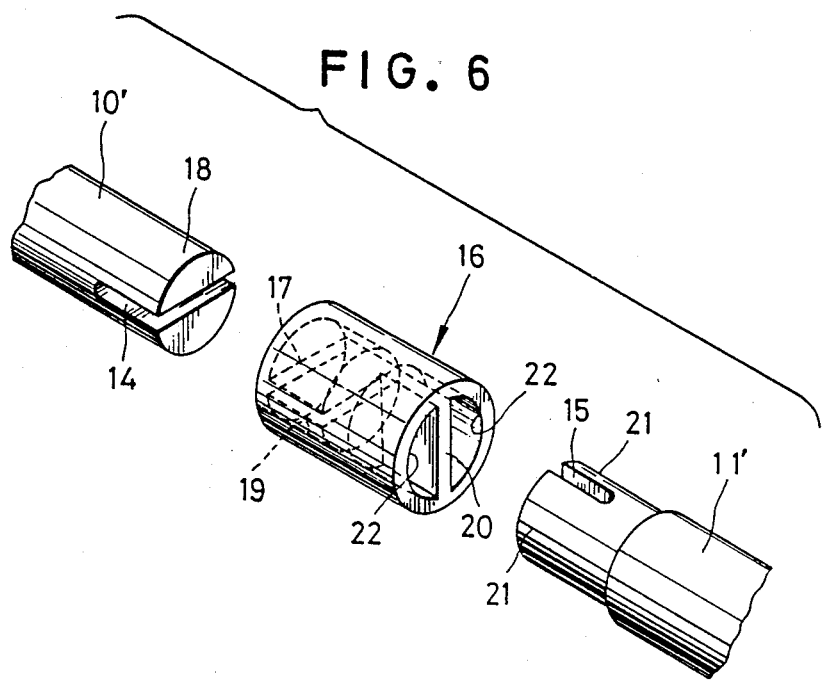
FIG. 6 is a perspective view illustrating the coupling, input shaft and output shaft of FIG. 5.

FIGS. 4 through 6 illustrate a preferred embodiment of the invention, in which portions similar to those of the prior-art arrangement of FIG. 3 are designated by like reference characters and need not be described again.

In the preferred embodiment, the speed reducer 5 has an input shaft 10' the distal end of which is provided with a first groove 14 extending longitudinally of the shaft 10' in alignment with the central axis thereof. The first groove 14 is open to the end face of the shaft 10' and to an outer wall surface 18 thereof. The motor 6 has an output shaft 11' the distal end of which is provided with a second groove 15, which is also open to the end face and outer wall surface 21 of the shaft 11'. Like the first groove 14, the second groove 15 extends longitudinally of the shaft 11' in alignment with the central axis thereof.

A coupling 16 for connecting the input shaft 10' and output shaft 11' consists of a synthetic resin or sintered metal and has at one end a first wall portion 17 inserted into the first groove 14 and an inner wall surface 19 for receiving the outer wall surface 18 of the input shaft 10'. The other end of the coupling 16 has a second wall portion 20 formed perpendicular to the first wall portion 17 for being inserted into the second groove 15 of the output shaft 11', and an inner wall portion 22 for receiving the outer wall surface 21 of the output shaft 11'. Since both ends of the wall portions 17, 20 are formed integral with the inner wall surfaces 19, 22, respectively, the wall portions 17, 20 possess sufficient strength. When the outer wall surfaces 18, 21 are brought into contact with the inner wall surfaces 19, 22, respectively, this increases the rotational torque transmission surface so that a high rotational torque transmission is made possible.

The coupling 16 is fitted onto the distal ends of the input and output shafts 10', 11', as shown in FIG. 4, thereby coupling the shafts 10', 11'.

It should be noted that the grooves 14, 15 can be formed in the opposite ends of the coupling 16, in which case the inner wall surfaces 19, 22 would be formed in the distal ends of the input and output shafts 10', 11', respectively.

Figure 7:
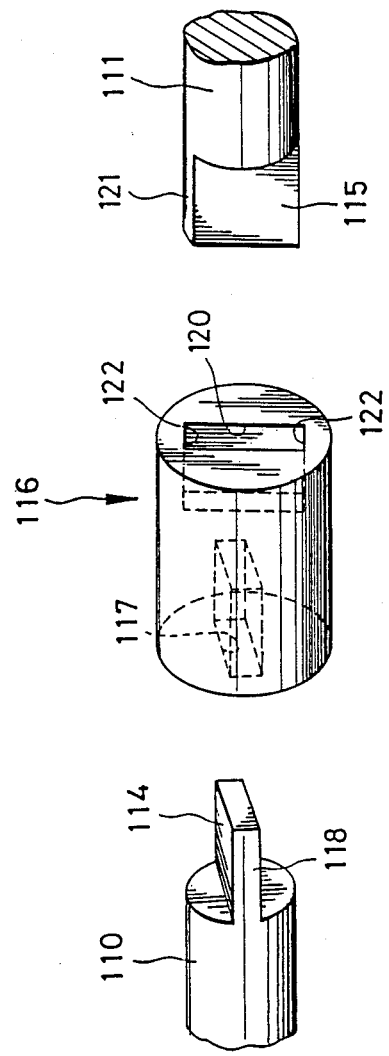
FIG. 7 is a perspective view corresponding to FIG. 6 and illustrating a modification of the invention.

In the modification shown in FIG. 7, grooves 117, 120 are formed in opposite ends of a coupling 116, wall portions 114, 115 are formed on the distal ends of input and output shafts 110, 121, respectively, the groove 120 is defined by an inner wall surface 122 at one end of the coupling 116, and the groove 117 is defined by an inner wall surface (not shown) at the other end of the coupling 116. An outer wall surface 121 of the wall portion 115 of output shaft 121 is received in the inner wall surface 122, and an outer wall surface 118 of the wall portion 114 of input shaft 110 is received in the inner wall surface (not shown) at the other end of the coupling 116.

Thus, according to the invention, the portions at which the wall portions are inserted into the groove are covered by the outer wall surfaces, so that any noise produced at the insertion portions will be reduced before leaking to the outside.

As many apparently widely different embodiments of the present invention can be made without departing from the spirit and scope thereof, it is to be understood that the invention is not limited to the specific embodiments thereof except as defined in the appended claims.

What we claim is:

1. A power seat apparatus for an automotive vehicle, comprising:

an upper rail adapted to receive an upper seat cushion;

a screw shaft supported on said upper rail;

a lower rail secured to a vehicle body;

a motor and speed reducer fixedly mounted on said lower rail for moving said screw shaft relative to said lower rail, thereby moving said upper rail;

said motor having an output shaft and said speed reducer having an input shaft, said input shaft having a longitudinally extending first groove at an end thereof and said output shaft having a longitudinally extending second groove at an end thereof perpendicular to said first groove;

a coupling for connecting said input shaft and said output shaft together, said coupling having a first end portion coupled to said input shaft and a second end portion coupled to said output shaft, said coupling including a first axially extending bore terminating at the first end portion and a second axially extending bore terminating at the second end portion and spaced from said first bore for providing a solid divider between said first and second bores;

said coupling further including a first wall portion for being inserted into said first groove, said coupling and said first wall portion being formed as a unitary body, said first wall portion extending the length of said first bore for dividing said first bore into two semi-cylindrical sections, and a second wall portion for being inserted into said second groove, said coupling and said second wall portion being formed as a unitary body, said second wall portion being substantially perpendicular to said first wall portion and extending the length of said second bore for dividing said second bore into two semi-cylindrical sections;

said coupling having a first inner wall surface formed by said first bore for receiving an outer wall surface of the end of the input shaft and a second inner wall surface formed by said second bore for receiving an outer wall surface of the end of the output shaft, the diameter of said first and second inner wall surfaces, the diameter of the outer wall surfaces, the thickness of said first and second wall portions and the thickness of said first and second grooves being relatively dimensioned for fitting said outer wall surfaces of said input and output shafts into said inner wall surfaces of said coupling, respectively, and said first and second wall portions into said first and second grooves, respectively.

2. A coupling adapted to connect a first shaft and a second shaft comprising:

a first end portion adapted to be coupled to said first shaft;

a second end portion adapted to be coupled to said second shaft;

a first axially extending bore terminating at said first end portion;

a second axially extending bore terminating at said second end portion and spaced from said first bore for providing a solid divider between said first and second bores;

a first wall portion for being inserted in a first groove in an end of said first shaft, said first end portion and said first wall portion being formed as a unitary body, said first wall portion extending the length of said first bore for dividing said first bore into two semi-cylindrical sections;

a second wall portion for being inserted in a second groove in an end of said second shaft, said second end portion and said second wall portion being formed as a unitary body, said second wall portion being substantially perpendicular to said first wall portion and extending the length of said second bore for dividing said second bore into two semi-cylindrical sections;

a first inner wall surface formed by said first bore for receiving an outer wall surface of the end of the first shaft;

a second inner wall surface formed by said second bore for receiving an outer wall surface of the end of the second shaft;

wherein the diameter of the first and second inner wall surfaces, the diameter of the outer wall surfaces, the thickness of the first and second wall portions and the thickness of said first and second grooves being relatively dimensioned for fitting said outer wall surfaces of said first and second shafts into said inner wall surfaces, respectively, and said first and second wall portions into said first and second grooves, respectively.

* * * * *